Oct. 29, 1957  A. D. BRUNDAGE  2,811,348
HOOD LIFT AND HOOD LATCH MECHANISM
Filed Nov. 22, 1954  7 Sheets-Sheet 1
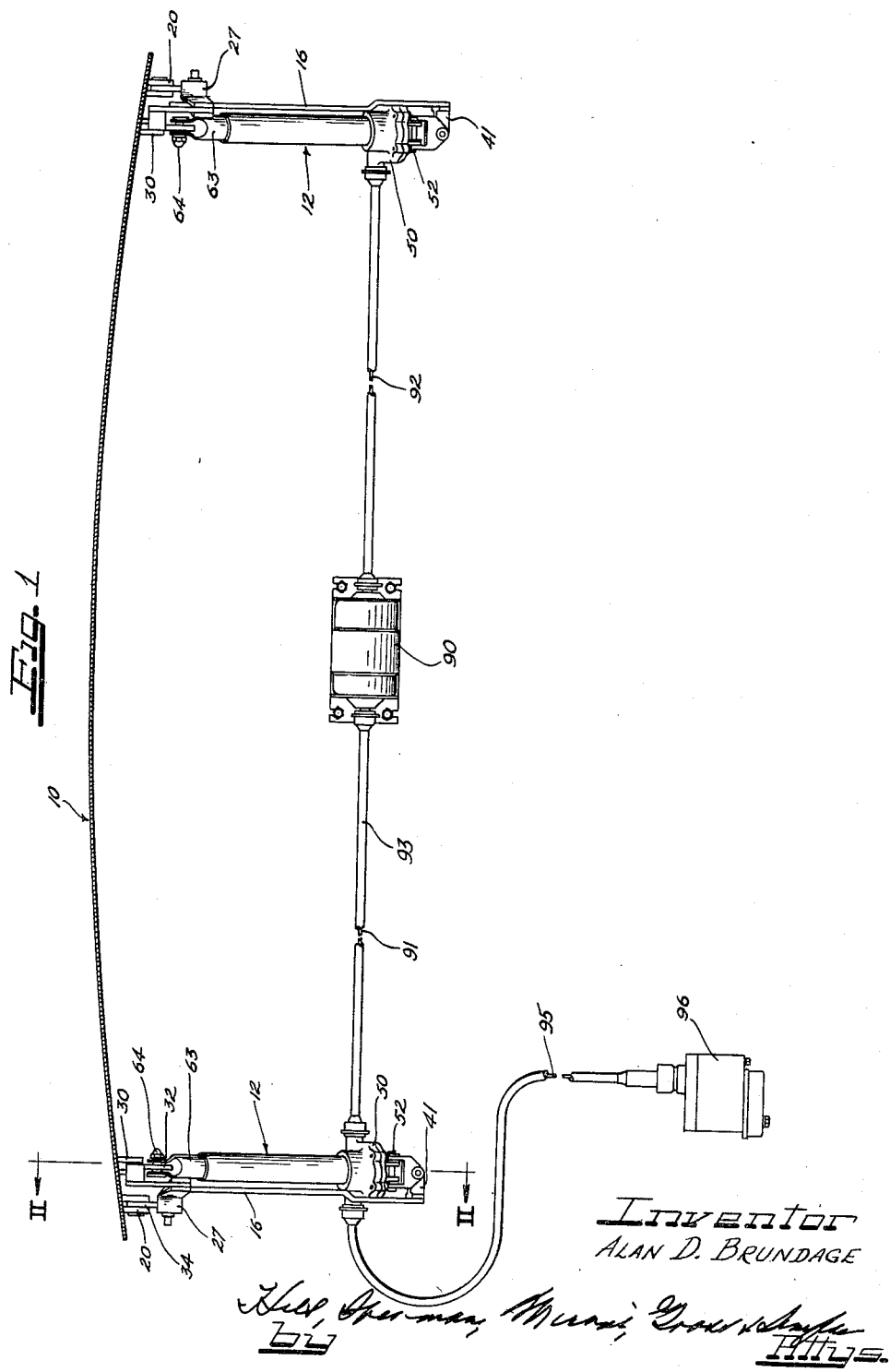
Inventor
ALAN D. BRUNDAGE Oct. 29, 1957     A. D. BRUNDAGE     2,811,348
HOOD LIFT AND HOOD LATCH MECHANISM
Filed Nov. 22, 1954                         7 Sheets-Sheet 2
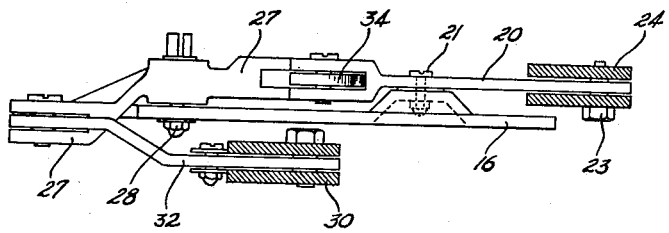
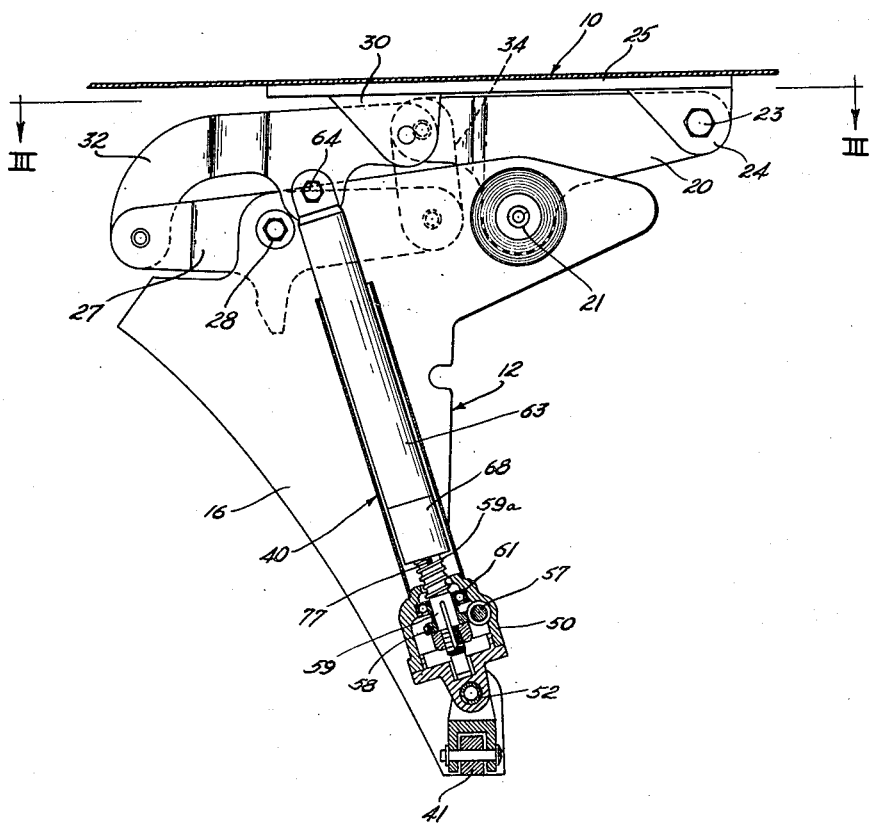
Inventor
ALAN D. BRUNDAGE

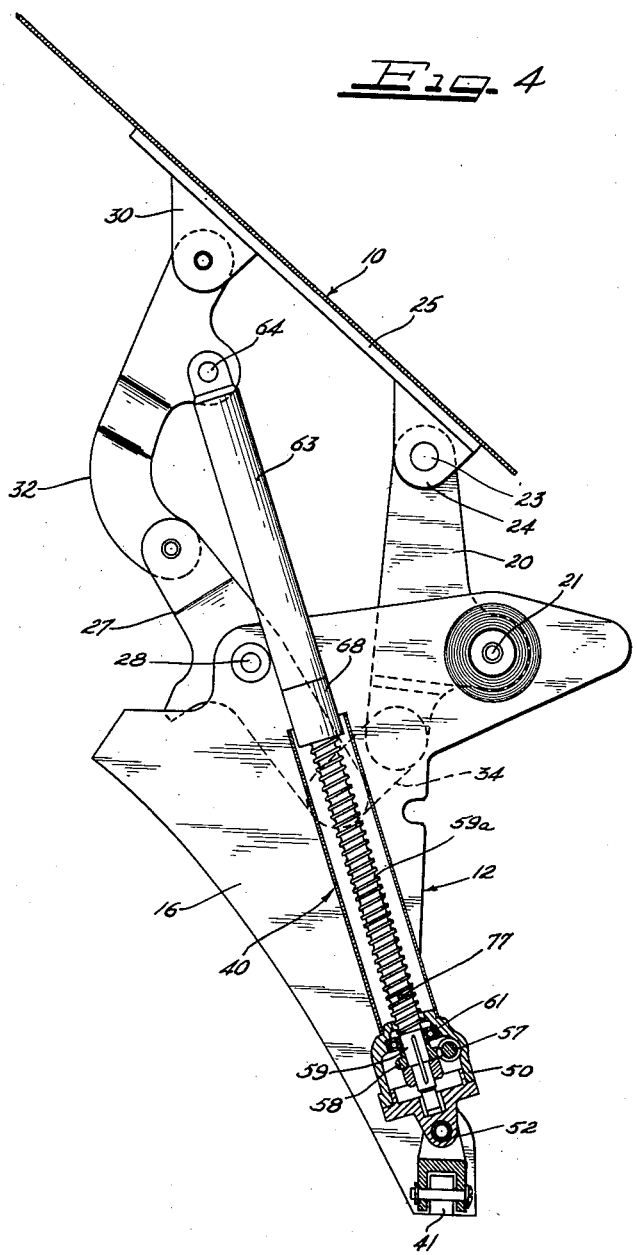

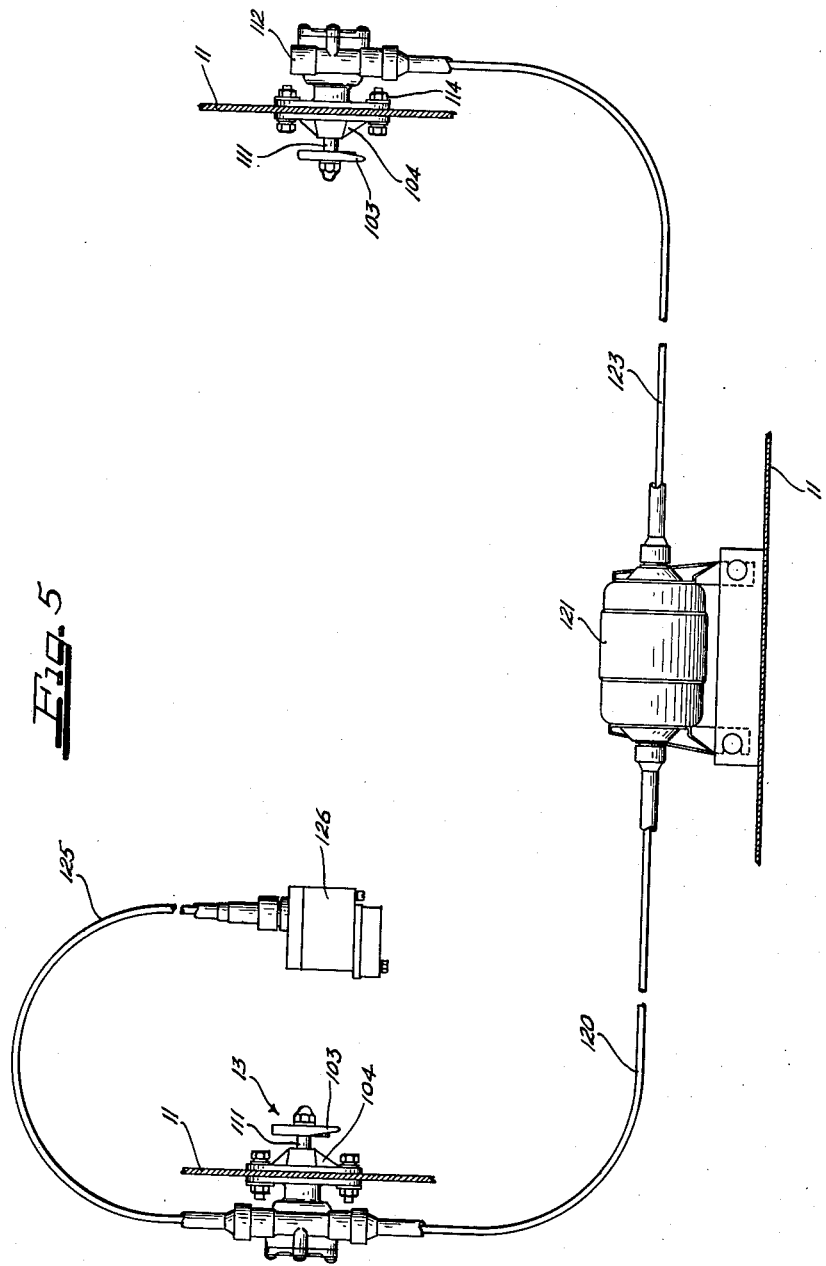

Oct. 29, 1957  A. D. BRUNDAGE  2,811,348
HOOD LIFT AND HOOD LATCH MECHANISM
Filed Nov. 22, 1954  7 Sheets-Sheet 5
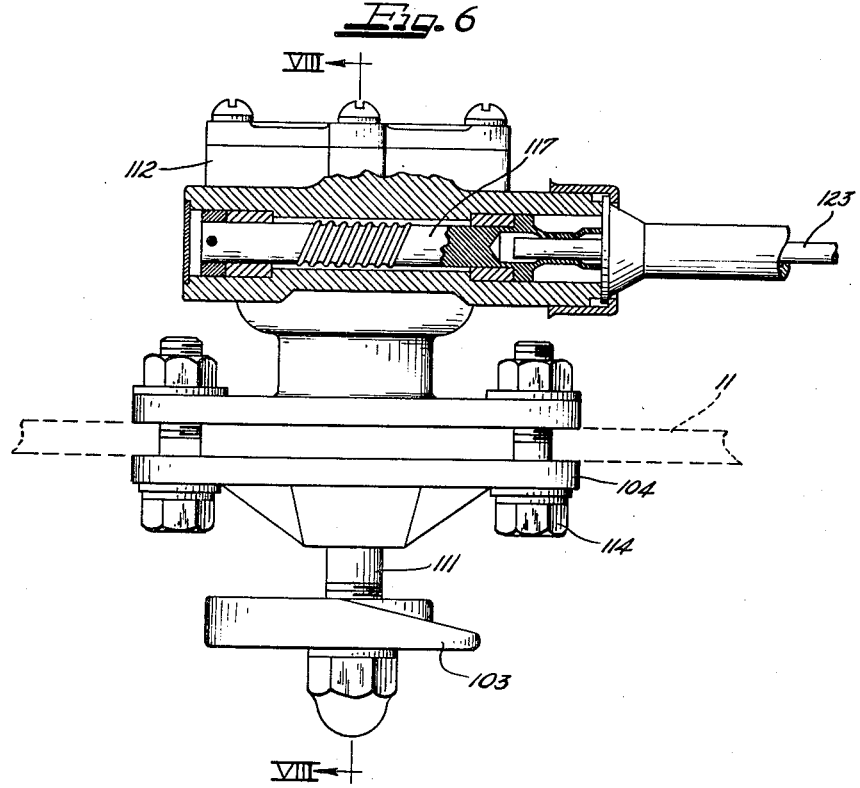
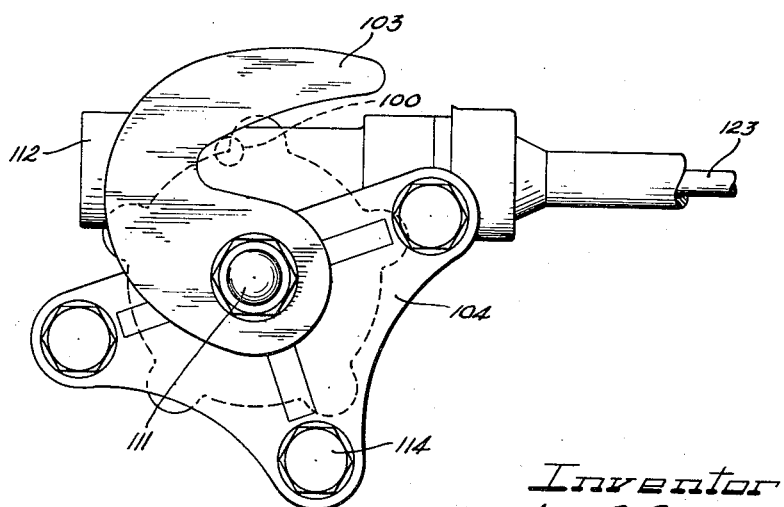
Inventor
ALAN D. BRUNDAGE Oct. 29, 1957 A. D. BRUNDAGE 2,811,348
HOOD LIFT AND HOOD LATCH MECHANISM
Filed Nov. 22, 1954 7 Sheets-Sheet 6
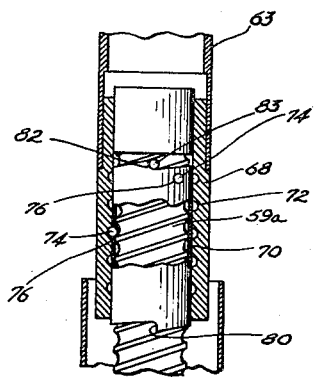
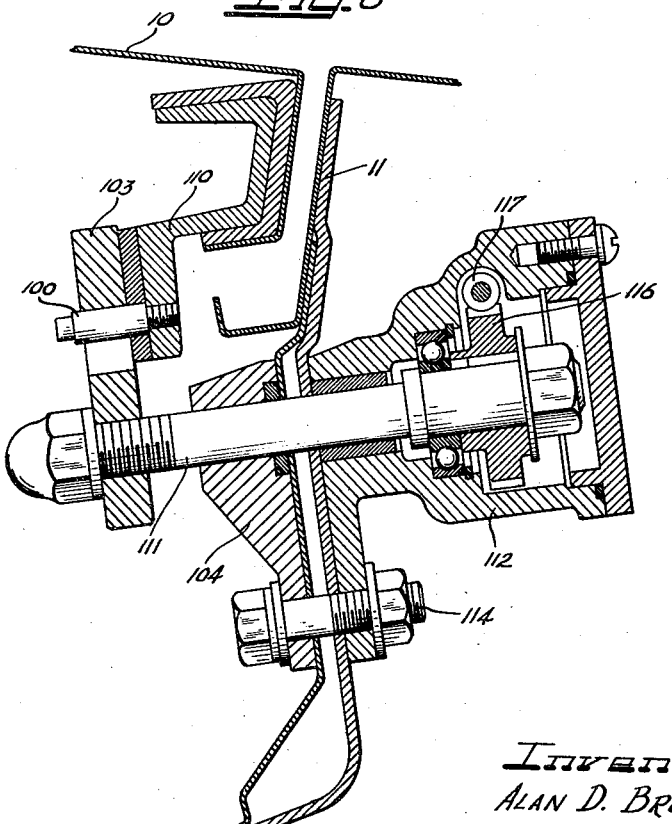
Inventor
ALAN D. BRUNDAGE

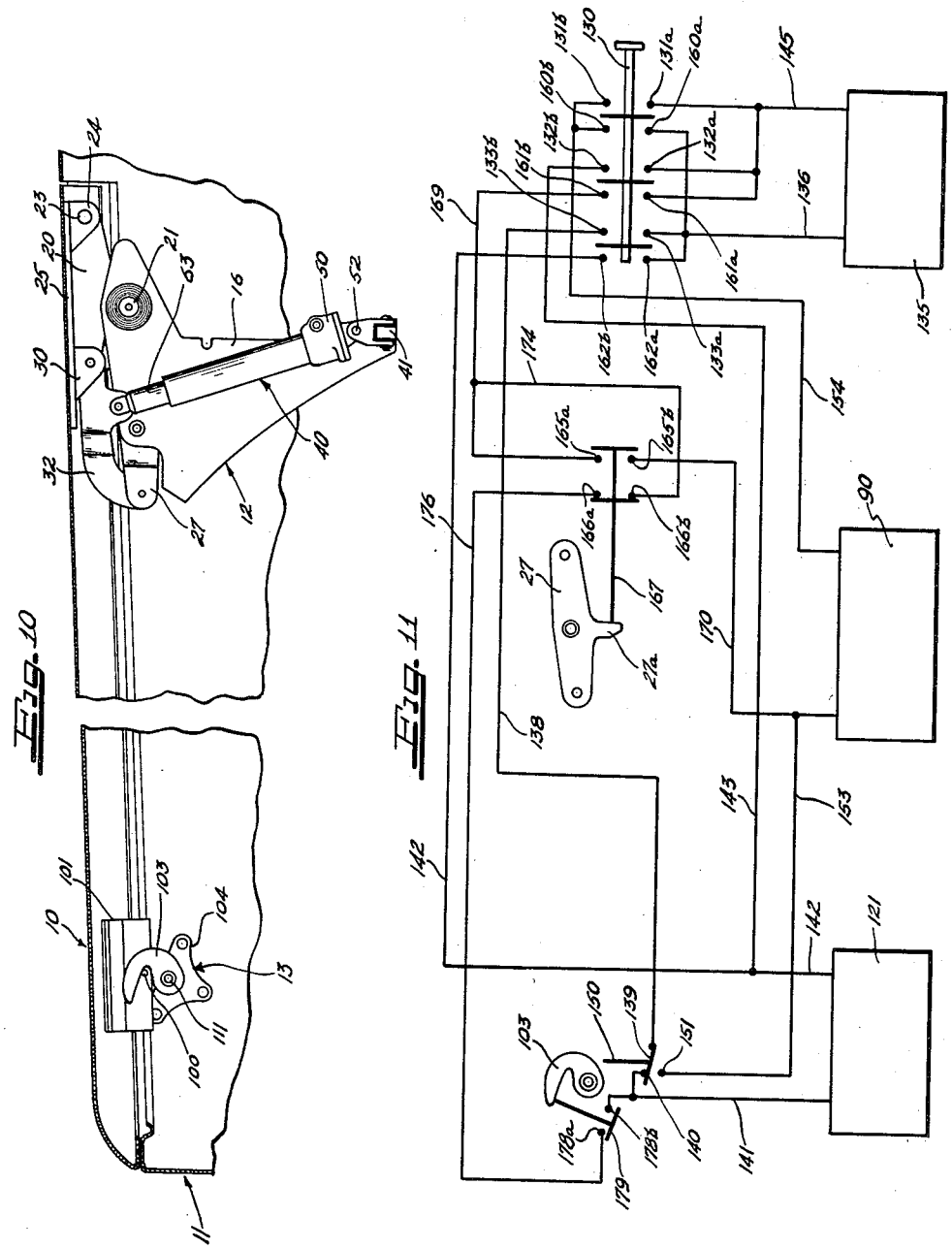

United States Patent Office 2,811,348
Patented Oct. 29, 1957

2,811,348

HOOD LIFT AND HOOD LATCH MECHANISM

Alan D. Brundage, Birmingham, Mich., assignor to Houdaille Industries, Inc., a corporation of Michigan Application November 22, 1954, Serial No. 470,485

4 Claims. (Cl. 268—74)

This invention relates to a power operated lift and latch mechanism for a closure member of an automotive vehicle, and more particularly relates to such a mechanism applied to the hood of an automotive vehicle wherein the lift and latch systems are coordinated to automatically unlatch and lift the hood or to automatically lower and latch the hood.

It is an important object of the present invention to provide means for power operation of the hood of an automotive vehicle.

Another object of the invention is to provide a coordinated power operated hood lift and latch mechanism for an automotive vehicle.

A further object of the present invention is to provide novel mechanism for controlling the raising and lowering and latching and unlatching of a closure member associated with an automotive vehicle.

Other objects, features and advantages of the present invention will be more fully apparent from the following detailed description taken in conjunction with the accompanying drawings, in which:

Figure 1 is a more or less schematic transverse sectional view illustrating the hood lifting mechanism according to the present invention;

Figure 2 is a fragmentary enlarged longitudinal sectional view taken generally along the line II—II of Figure 1;

Figure 3 is a fragmentary horizontal sectional view taken generally along the line III—III of Figure 2;

Figure 4 is a fragmentary longitudinal sectional view similar to Figure 2 but showing the hood lift mechanism in extended position with the hood raised;

Figure 5 is a more or less schematic horizontal sectional view illustrating the hood latching mechanism according to the present invention;

Figure 6 is an enlarged fragmentary plan view of the hood latch mechanism at one side of the vehicle and with certain parts broken away and in section;

Figure 7 is a fragmentary side elevational view of the structure of Figure 6;

Figure 8 is a fragmentary transverse sectional view taken generally along the line VIII—VIII of Figure 6;

Figure 9 is a fragmentary longitudinal sectional view illustrating certain details of the hood lift mechanism shown in Figures 2 and 4;

Figure 10 is a fragmentary longitudinal sectional view illustrating somewhat schematically the disposition of the hood lift and latch mechanism within the vehicle; and Figure 11 is a schematic electric circuit diagram illustrating the manner in which the hood lift and latch may be coordinated for operation by a single control.

As shown on the drawings:

Referring to Figure 10 of the drawings, the present invention relates particularly to a lift and latch mechanism for the hood 10 of an automotive vehicle 11. The lift mechanism indicated generally at 12 may be disposed at each side of the hood at the rear thereof, while the latch mechanism indicated generally at 13 may be disposed at each side of the hood generally at the front thereof. Since the lift and latch mechanisms at each side of the vehicle are generally similar, the mechanism at only one side need be described in detail, and corresponding reference numerals have been applied to the similar parts.

Referring particularly to Figures 1 through 4, it will be observed that the hood lift mechanism 12 includes a mounting bracket 16 which may be carried at the interior of the vehicle 11 in any suitable manner. The bracket 16 is connected with the hood 10 by means of a linkage which is constructed to move the rear edge of the hood forwardly a limited amount during upward pivoting of the hood. For moving the rear edge of the hood forwardly, the linkage includes a first link 20 pivotally secured to the bracket 16 by means of a shaft 21 and pivotally connected to the hood by means of a pivot pin 23 and a lug 24 of bracket 25 on the interior of the hood 10. For guiding the upward pivotal movement of the hood 10, a rocker link 27 is pivoted to the bracket 16 on a shaft 28 and is connected to a second lug 30 on hood bracket 25 by means of an intermediate link 32. To effect simultaneous operation of both linkages, a connector link 34 is provided which pivots the linkage 20 as the linkage 27, 32 is operated. For raising and lowering the hood 10, a suitable power lift mechanism indicated generally at 40 is connected between a lug 41 on the bracket 16 and the intermediate link 32, the power means being extensible to raise the hood to the position indicated in Figure 4.

The extensible power means 40 is preferably of the type which is arranged to automatically stop at its extreme open and closed positions even though the drive motor therefor continues to operate. As herein shown, a worm and worm gear housing 50 is secured to the bracket lug 41 by means of a pivot shaft 52. The gear housing is shown as having a worm 57 journaled therein meshing with and driving a worm gear 58 keyed or otherwise secured to a vertical shaft 59 journaled in the worm gear housing 50 on an anti-friction bearing 61. The shaft 59 is provided with an upper helically threaded portion 59a which rotates with the worm gear 58 to extend an actuating sleeve or tube 63 pivotally connected to the intermediate link 32 by means of a shaft 64 at its upper end. At the lower end of the tube 63 is an elongated sleeve or nut 68 which is suitably secured to the sleeve 63. A retainer cage 70, Figure 9, is interposed between the shaft 59a and the nut 68, and the nut 68 is shown as having a plurality of spaced concentric annular grooves 72 therein receiving balls 74 carried in apertures 76 of the retainer cage 70. The apertures 76 are spaced along the cage 70 and are offset with respect to each other to correspond to the lead of the helical thread of shaft 59a. The balls 74 engage in the helical groove of shaft 59a so that rotation of the shaft raises nut 68 through the medium of balls 74.

The cage 70 has a stop notch or lug 80 at its lower end, which is engageable with a stop pin 77 (Figures 2 and 4) projecting from the shaft 59a within one of the threads thereof. The stop pin serves to rotate the cage 70 with the shaft 59a at the lower extreme end of travel of the nut 68 along the shaft, thus causing the balls 74 to travel around the annular concentric grooves 72 and stopping rectilinear movement of the tube 63 along the shaft 59a in spite of continued rotation of the shaft. At the upper end of the retainer cage 70 is a notch 82 engageable with a stop pin 83 at the upper end of the shaft 59a for rotating the retainer cage 70 with the shaft 59a at the upper limit of travel of the nut 68 along the shaft. The pin 83 thus serves to stop travel of the tube 63 along the shaft when the hood of the vehicle is in fully opened position as shown in Figure 4, while the pin 77 serves to stop travel of the tube 63 along the shaft when the hood of the vehicle is in fully closed position as shown in Figure 2, without attention from the operator.

It will be understood that the stop pins 77 and 83, when engaged with the respective notches 80 and 82, rotate the cage 70 and cause the balls 74 to travel in the annular concentric grooves 72 when the shaft 59a is rotating in one direction. However, as soon as the direction of rotation of the shaft 59a is reversed, notch 80 or 82 will move away from stop pin 77 or 83 respectively and the hood will be raised or lowered in accordance with the new direction of rotation.

Referring now to the drive means for the worm 57, a motor 90 is shown in Figure 1 as being carried in the vehicle under the hood 10. The motor 90 may be a suitable reversible electric motor and is shown as driving flexible shafts 91 and 92 from opposite ends thereof. The flexible shaft 91 is shown as being cased in a sheath 93 and as driving the hood lift mechanism 12 at one side of the vehicle, while flexible shaft 92 is of course coupled to a complementary lift mechanism at the other side of the vehicle.

To provide for emergency operation of the hood lift in case of a power failure, an auxiliary drive shaft 95 is provided which is coupled directly to one lift mechanism 12 at the worm 57 thereof and is adapted to drive the other lift mechanism through the last mentioned worm 57, the drive shaft 91, the rotor of the motor 90, the drive shaft 92 and the corresponding worm 57 of the other lift mechanism. The flexible shaft 95 may be normally disengaged from the adjacent worm 57 and be engageable therewith. Housing 96 may enclose a suitable coupling mechanism so that shaft 95 may be driven by a crank or electric rotary power tool such as an electric drill. The housing 96 is of course positioned so as to provide convenient access under emergency conditions, for example from within the passenger space of the motor vehicle.

Referring now to Figures 5 through 8, the hood latching mechanism 13 may comprise a latch pin such as 100 in Figure 10 on each side of the hood at the front thereof carried by a hood bracket 101 and cooperating with a latch member 103 carried on a bracket 104 secured to the vehicle body 11. As seen in Figure 8, the pin 100 is carried by means of a bracket 110, while the latch 103 is carried on a shaft 111 rotatably journaled in a housing 112 secured with the bracket 104 by means of bolts 114. Within the housing 112, shaft 111 carries a worm gear 116 which is suitably keyed thereto and is driven by a worm shaft 117. As seen in Figure 5, the worm shafts 117 of the latch mechanisms may in turn be driven by flexible shafts 120 and 123 extending from opposite ends of the rotor of a conventional reversible electric motor 121 which may also be carried by the vehicle under the hood 10. An auxiliary drive flexible shaft 125 may be provided for emergency operation of the hood latch mechanism in case of a power failure and the shaft 125 may be driven through suitable gears within a housing 126 by means of a crank or portable power tool as described in conjunction with the auxiliary shaft 95 for the hood lift mechanism.

By way of illustrative example, a schematic electric circuit for coordinating the operation of the hood latch and lift is illustrated in Figure 11. For unlatching the latch 103 and raising the hood, the actuating rod 130 is retracted to make contacts 131a, 131b, 132a, 132b, and 133a, 133b. A closed circuit then extends from one terminal of battery 135 through conductor 136, contacts 133a, 133b, conductor 138, switch arm 139, contact 140, conductor 141 to one terminal of the latch motor 121. The circuit is completed to the other terminal of the battery 135 through conductors 142, and 143, contacts 132b, 132a and conductor 145. With this polarity of energization of the motor 121, the motor drives the latch mechanism to unlatch the hood. At the end of the unlatching movement of the latch 103 indicated schematically in Figure 11, a portion of the latch 103 strikes an actuating rod 150 to snap the switch arm 139 to its lower position connecting with contact 151. The latch motor 121 is then deenergized and the lift motor 90 is energized to raise the hood through 136, 133a, 133b, 138, switch arm 139, contact 151, conductor 153 to one terminal of the lift motor 90 and from the other terminal of the motor 90 through conductor 154, contacts 131b, 131a and conductor 145 to the other terminal of the battery 135. When the power lift device 40 reaches its fully extended position as shown in Figure 9, the pin 83 strikes the notch 82 to prevent further travel of the nut 68. The actuating rod 130 is then released to deenergize the motor 90.

If now it is desired to lower the hood 10, the actuating rod 130 is moved forwardly from its neutral position shown in Figure 11 to establish continuity between contacts 160a, 160b, 161a, 161b, and 162a, 162b. With the hood raised, the rocker link 27 will be in an inclined position as shown in Figure 4 so that contacts 165a, 165b will be closed and contacts 166a, 166b will be open, a lug 27a depending from the link 27 being diagramatically indicated as operating an actuating arm 167 having contactors controlling the contacts 165a, 165b and 166a, 166b. Under these conditions, reverse polarity is applied to the hood lift motor 90, the circuit extending from 145 through contacts 161a, 161b, conductor 169, contacts 165a, 165b and conductor 170 to one terminal of the motor 90 and from the other terminal of the motor 90 through conductor 154, contacts 160b, 160a and conductor 136 to the other terminal of the battery 135. When the hood 10 is in fully closed position, the rocker link 27 operates the actuator bar 167 to snap contacts 165a, 165b open and contacts 166a, 166b closed. A circuit is then closed to the latch motor 121 from one terminal of the battery 135 through conductor 145, contacts 161a, 161b, conductor 169, conductor 174, contacts 166b, 166a, conductor 176, contacts 178a, 178b of switch 179 (which is closed when the latch 103 is in unlatched position), and conductor 141 and from the other terminal of the latch motor 121 through conductor 142, contacts 162b, 162a and conductor 136 to the other terminal of the battery 135. The latch motor 121 then moves the latch 103 to latching position, the latch 103 opening the switch 179 to deenergize the latch motor 121 when the latch has reached fully latched position.

It will be understood that modifications and variations may be effected without departing from the scope of the novel concepts of the present invention.

I claim as my invention:

1. In an enclosure covering raising mechanism having a two-directional drive motor with a covering framework to be raised and lowered, a stationary mounting bracket and an actuating mechanism connected between said stationary bracket and said framework for raising and lowering said framework and driven by said two-directional drive motor, the improvement characterized by a linkage guiding said covering framework for bodily movement in a horizontal direction as said actuating mechanism pivots said covering framework upwardly, the linkage including a first rocker link pivotally mounted intermediate its ends and having one end pivoted to said framework adjacent a margin of the framework and having an opposite end, the linkage further including a second rocker link pivoted intermediate its ends and having one end connected to said opposite end of siad first rocker link, and a further link pivotally connected at one end to the other end of said second rocker link and at its other end to said framework remote from said margin, raising of the framework raising the other end of the second rocker link to lower the other end of the first rocker link to raise said margin and simultaneously shift the margin horizontally.

2. In an enclosure covering raising mechanism having a two-directional drive motor with a covering framework to be raised and lowered, a stationary mounting bracket and an actuating mechanism connected between said stationary bracket and said framework for raising and lowering said framework and driven by said two-directional drive motor, the improvement characterized by a linkage guiding said covering framework for bodily movement in a horizontal direction as said actuating mechanism pivots said covering framework upwardly, a linkage including a first rocker link pivotally mounted intermediate its ends and having one end pivoted to said framework adjacent a margin of the framework and having an opposite end, the linkage further including a second rocker link pivoted intermediate its ends and having one end connected to said other end of said first rocker link, and a further link pivoted at one end to the other end of said second rocker link and at its other end to said framework remote from said margin, raising of the framework raising the other end of the second rocker link to lower the other end of the first rocker link to raise said margin and simultaneously shift the margin horizontally, and said actuating mechanism acting on said further link intermediate the ends thereof for raising said covering framework.

3. In an enclosure covering raising mechanism having a two-directional power means with a covering framework to be raised and lowered, a stationary mounting bracket and an actuating mechanism connected between said stationary bracket and said framework for raising and lowering said framework and driven by said power means, the improvement characterized by a linkage guiding said covering framework for bodily movement in a horizontal direction as said actuating mechanism pivots said covering framework upwardly, the linkage including a first rocker link pivotally mounted intermediate its ends and having one end pivoted to said framework adjacent a margin of the framework and having an opposite end, the linkage further including a second rocker link pivoted intermediate its ends and having one end connected to said other end of said first rocker link, and a further link pivoted at one end to the other end of said second rocker link and at its other end to said framework remote from said margin, raising of the framework raising the other end of the second rocker link to lower the other end of the first rocker link to raise said margin and simultaneously shift the margin horizontally, and said stationary mounting bracket pivotally carrying said first and second rocker links.

4. In a motor vehicle, a hood carried by the vehicle for movement between an open and a closed position, a hood lift mechanism connected adjacent one margin of the hood for pivoting the hood between open and closed positions, a hood latch mechanism located adjacent an opposite margin of the hood for latching the hood in closed position and for unlatching the hood to accommodate movement thereof to open position, electrically operated power means controlling and driving said hood lift and latch mechanisms, and limit switch means responsive to movements of said hood lift mechanism and said hood latch mechanism and coordinating operation of said hood lift and hood latch mechanisms by said electrically operated power means.

References Cited in the file of this patent

UNITED STATES PATENTS

| | | |
|---|---|---|
| Re. 21,775 | Falcon | Apr. 22, 1941 |
| 1,002,029 | Brown | Aug. 29, 1911 |
| 1,002,030 | Brown | Aug. 29, 1911 |
| 1,151,479 | Kurtz | Aug. 24, 1915 |
| 1,367,931 | Varnum | Feb. 8, 1921 |
| 1,631,508 | Wagner | June 7, 1927 |
| 1,943,927 | Phillips | Jan. 16, 1934 |
| 2,190,297 | Salkvist | Feb. 13, 1940 |
| 2,366,734 | Lear | Jan. 9, 1945 |
| 2,479,713 | Beach | Aug. 23, 1949 |
| 2,535,600 | Rappl | Dec. 26, 1950 |
| 2,541,288 | Rice | Feb. 13, 1951 |
| 2,553,023 | Walters | May 15, 1951 |
| 2,558,867 | May et al. | July 3, 1951 |
| 2,594,643 | Gustisha | Apr. 29, 1952 |